(12) United States Patent
Chatham

(10) Patent No.: US 10,520,323 B1
(45) Date of Patent: Dec. 31, 2019

(54) MAP REPORTS FROM VEHICLES IN THE FIELD

(71) Applicant: Waymo LLC, Mountain View, CA (US)

(72) Inventor: Andrew Hughes Chatham, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 15/729,182

(22) Filed: Oct. 10, 2017

Related U.S. Application Data

(62) Division of application No. 14/813,822, filed on Jul. 30, 2015, now Pat. No. 9,810,540, which is a division of application No. 13/465,578, filed on May 7, 2012, now Pat. No. 9,123,152.

(51) Int. Cl.
*G01C 21/34* (2006.01)
*H04L 29/06* (2006.01)
*G01S 19/13* (2010.01)
*G06F 16/44* (2019.01)

(52) U.S. Cl.
CPC .............. *G01C 21/34* (2013.01); *G01S 19/13* (2013.01); *G06F 16/444* (2019.01); *H04L 67/42* (2013.01)

(58) Field of Classification Search
CPC ........ G01C 21/34; G01C 21/32; G01C 21/30; G01C 21/26; G01S 19/13; G01S 19/50; G06F 17/30061; H04L 67/42; G01D 1/0246; G01D 1/0088; G01D 1/0278; G07C 5/008; B60W 2250/402
See application file for complete search history.

(56) References Cited

U.S. PATENT DOCUMENTS

| | | | |
|---|---|---|---|
| 5,032,845 A * | 7/1991 | Velasco ................... | G01S 1/245 342/389 |
| 5,774,824 A | 6/1998 | Streit et al. | |
| 5,913,379 A | 6/1999 | Young et al. | |
| 5,925,082 A | 7/1999 | Shimizu et al. | |
| 6,012,013 A | 1/2000 | McBurney | |
| 6,249,740 B1 | 6/2001 | Ito et al. | |
| 6,622,085 B1 * | 9/2003 | Amita ................... | G01C 21/32 340/990 |

(Continued)

FOREIGN PATENT DOCUMENTS

| | | |
|---|---|---|
| EP | 2216225 A1 | 8/2010 |
| WO | 2001088827 A1 | 11/2001 |

OTHER PUBLICATIONS

"Google Cars Drive Themselves, in Traffic" [online]. [Retrieved Aug. 19, 2011] Retrieved from the internet: <http://www.nytimes.com/2010/10/10/science/10google.html>, 4 pages.

(Continued)

*Primary Examiner* — Rachid Bendidi
(74) *Attorney, Agent, or Firm* — Botos Churchill IP Law LLP

(57) ABSTRACT

Aspects of the present disclosure relate generally to systems and methods for assessing validity of a map using image data collected by a laser sensor along a vehicle path. The method may compile image data received from the laser sensor. The map subject to assessment may define an area prohibiting entry by a vehicle.

17 Claims, 14 Drawing Sheets

(56) References Cited

U.S. PATENT DOCUMENTS

| | | | |
|---|---|---|---|
| 6,728,392 B1* | 4/2004 | Joshi | G06K 9/6204 |
| | | | 382/104 |
| 7,102,496 B1 | 9/2006 | Ernst, Jr. et al. | |
| 7,865,277 B1 | 1/2011 | Larson et al. | |
| 8,457,880 B1 | 6/2013 | Malalur et al. | |
| 9,384,402 B1* | 7/2016 | Furman | G06K 9/00805 |
| 2004/0044468 A1* | 3/2004 | Adachi | G01C 21/30 |
| | | | 701/532 |
| 2005/0283699 A1* | 12/2005 | Nomura | G01C 21/32 |
| | | | 714/746 |
| 2006/0155463 A1* | 7/2006 | Adachi | G01C 21/32 |
| | | | 701/461 |
| 2007/0239331 A1 | 10/2007 | Kaplan | |
| 2007/0271036 A1* | 11/2007 | Atarashi | G01C 21/32 |
| | | | 701/446 |
| 2008/0021628 A1 | 1/2008 | Tryon | |
| 2008/0059062 A1 | 3/2008 | Kanamori | |
| 2008/0161987 A1* | 7/2008 | Breed | G08G 1/161 |
| | | | 701/27 |
| 2009/0271108 A1 | 10/2009 | Kobori et al. | |
| 2010/0030473 A1 | 2/2010 | Au et al. | |
| 2010/0061591 A1 | 3/2010 | Okada et al. | |
| 2010/0082232 A1* | 4/2010 | Lee | G01C 21/3626 |
| | | | 701/533 |
| 2011/0052861 A1* | 3/2011 | Rock | A41D 31/0033 |
| | | | 428/92 |
| 2011/0172914 A1 | 7/2011 | Coulmeau et al. | |
| 2011/0267452 A1* | 11/2011 | Notsu | G06K 9/0798 |
| | | | 348/116 |
| 2011/0279452 A1 | 11/2011 | Ibe et al. | |
| 2012/0005180 A1* | 1/2012 | Chen | G01C 21/367 |
| | | | 707/705 |
| 2012/0202525 A1* | 8/2012 | Pettini | H04W 4/043 |
| | | | 455/456.3 |
| 2012/0296560 A1 | 11/2012 | Zheng et al. | |
| 2012/0316780 A1 | 12/2012 | Huth | |
| 2013/0212079 A1* | 8/2013 | Verheyden | G01C 21/32 |
| | | | 707/705 |
| 2013/0257657 A1 | 10/2013 | Garin et al. | |
| 2014/0046582 A1 | 2/2014 | Tijink et al. | |
| 2014/0074393 A1 | 3/2014 | Kojima et al. | |
| 2014/0222340 A1* | 8/2014 | Celia | G01C 21/32 |
| | | | 701/533 |
| 2015/0266422 A1 | 9/2015 | Chundrlik, Jr. et al. | |

OTHER PUBLICATIONS

Wikipedia, "Simultaneous localization and mapping", retrieved from <http://en.wikipedia.org/wiki/Simultaneous_localization_and_mapping>, downloaded on Apr. 9, 2015.

* cited by examiner

MAP REPORTS FROM VEHICLES IN THE FIELD

CROSS-REFERENCES TO RELATED APPLICATIONS

The present application is a divisional of U.S. patent application Ser. No. 14/813,822, filed Jul. 30, 2015, which is a divisional of U.S. patent application Ser. No. 13/465,578, filed May 7, 2012, now U.S. Pat. No. 9,123,152, the disclosure of which is incorporated herein by reference.

BACKGROUND OF THE INVENTION

Autonomous vehicles use various computing systems to aid in the transport of passengers from one location to another. Some autonomous vehicles may require some initial input or continuous input from an operator, such as a pilot, driver, or passenger. Other systems, such as autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

The autonomous vehicle may rely on maps, particularly in autonomous mode, for navigating the vehicle. However, the maps relied on by the autonomous vehicles may be out of date or otherwise inaccurate as compared to reality, due to construction, accidents or landscape changes.

BRIEF SUMMARY OF THE INVENTION

When suspicion arises with respect to the accuracy of any map, a prohibited zone or blockage may be created on that map preventing entry by the autonomous vehicles in an autonomous mode.

One aspect of the disclosure provides a method for assessing validity of a map. The method may include receiving image data from a laser sensor. The image data may be collected along a vehicle path and compiled to form a first image. The method may also include identifying a map related to the vehicle path, comparing the map to the first image, and assessing validity of the map based on the comparison. In one example, a signal may be transmitted to a server via a network indicating the result of the assessment. The map may include an area prohibiting entry by a vehicle.

Another aspect of the disclosure provides a method for assessing validity of a map, the method including determining a plurality of locations of a vehicle along a path. A trajectory of the vehicle may be determined based on the locations and compared with the map, and a validity of the map may be assessed based on the comparison.

In one example, the method may include a determination of whether the map includes a plausible path consistent with the trajectory. When the map does not include a plausible path consistent with the trajectory, a signal may be transmitted to a server indicating that the map is invalid. When the map includes a plausible path consistent with the trajectory, a signal may be transmitted to a server indicating that the map is valid.

Yet another aspect of the disclosure provides a method for assessing validity of a map, the method including receiving a compressed image describing a vehicle path of an area, reconstructing the compressed image to form a first image, identifying a map related to the area, and displaying the first image in relation to the map. In one example, the compressed image is derived from image data collected by a laser sensor.

Another aspect of the disclosure provides a system for assessing validity of a map. The system may include a processor, and may also include at least one of a laser sensor, a Global Positioning Sensor, and a camera. A memory may store a map associated with a vehicle path, and may include data and instructions executable by the processor. The data and instructions, when executed by the processor, may determine a plurality of locations of a vehicle along the vehicle path, and may determine a trajectory of the vehicle based on the locations. The trajectory may be compared with the map, and a validity of the map may be assessed based on the comparison. In one example, the system may include a cellular modem configured to transmit a result of the assessment to a server.

Yet another aspect of the disclosure provides a method for assessing validity of a map, in which a current location of a vehicle is determined. The method may include determination of whether the map includes a plausible location consistent with the current location of the vehicle. Validity of the map may be assessed based on the determination.

BRIEF DESCRIPTION OF THE DRAWINGS

The accompanying drawings, which are incorporated in and constitute a part of this specification, illustrate embodiments of the present disclosure and, together with the detailed description of the embodiments given below, serve to explain the principles of the disclosure.

DETAILED DESCRIPTION

Figure 1:
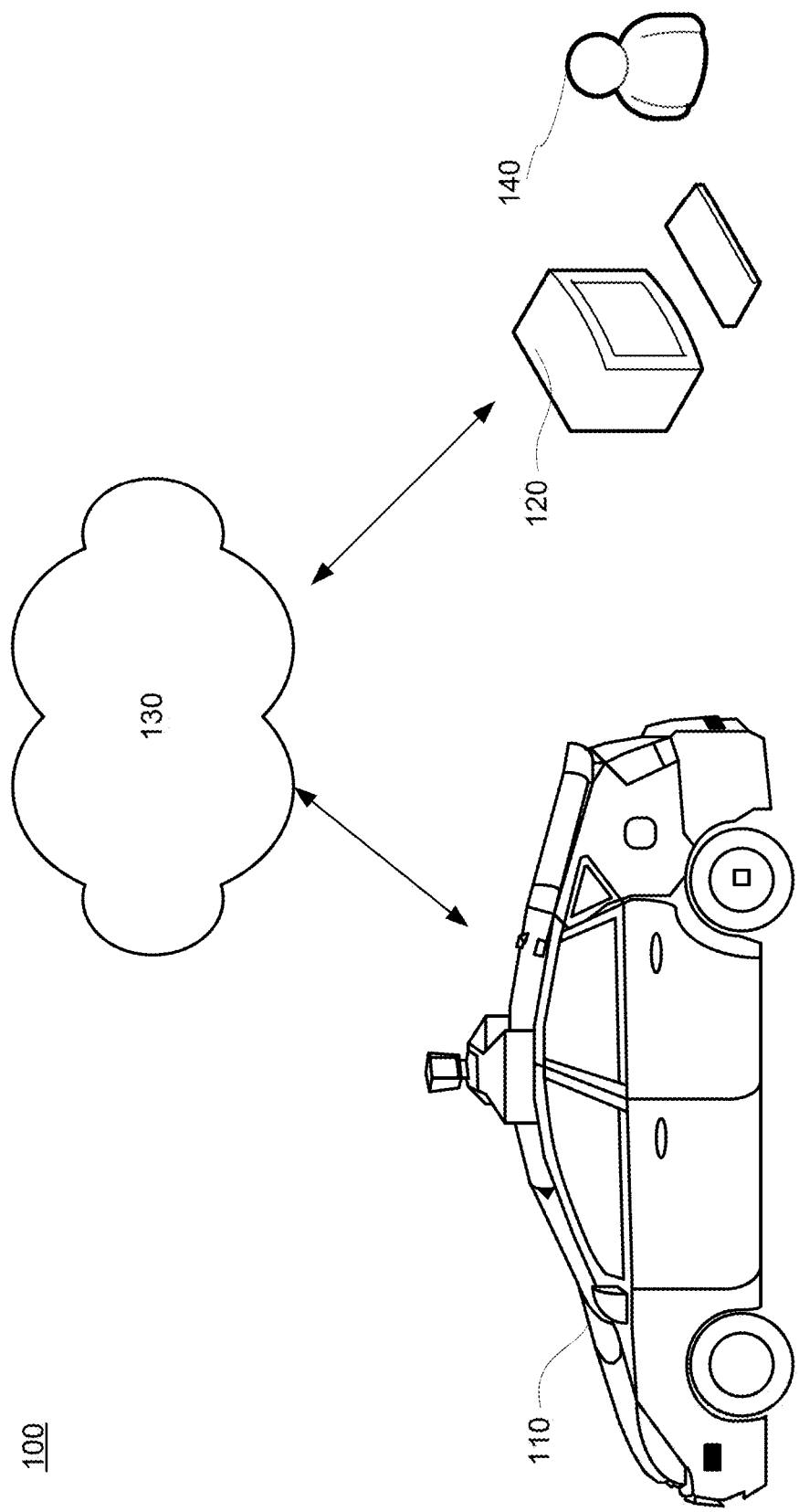
FIG. 1 is a block diagram of a network that connects an autonomous vehicle and a server in accordance with aspects of the disclosure.

For simplicity and clarity of illustration, like reference numerals may be used in the drawings to identify identical or analogous structural elements.

Flowcharts may be used in the drawings to illustrate processes, operations or methods performed by components, devices, parts, systems, or apparatuses disclosed herein. The flowcharts are mere exemplary illustrations of steps performed in individual processes, operations or methods. Steps may not be performed in the precise order as illustrated in the flowcharts. Rather, various steps may be handled simultaneously or performed in sequences different from that illustrated. Steps may also be omitted from or added to the flowcharts unless otherwise stated.

FIG. 1 illustrates an environment 100 in which embodiments of the present invention may be utilized, including an autonomous vehicle 110, a server 120, and a network 130 that facilitates direct or indirect communication between the autonomous vehicle 110 and the server 120. A user 140 may interact with the autonomous vehicle 110 via the server 120.

The network 130 may be, e.g., a wireless network, such as the Global System for Mobile Communications/General Packet Radio service (GSM/GPRS), Code Division Multiple Access (CDMA), Enhanced Data Rates for Global Evolution (EDGE), Universal Mobile Telecommunications System (UMTS), or a broadband network such as Bluetooth and Wi-Fi (the brand name for products using IEEE 802.11 standards). The network 130 may be identified by a Service Set Identifier (SSID), which is the key to access the network 130 by a wireless device. Each component coupled to the network 130, e.g., the vehicle 110 or the server 120, is a node in the network 130. Each node on the network 130 is preferably uniquely identified by a Media Access Control address (MAC address).

It is understood that the present invention is not limited to the network types and network components described in the illustrative embodiment of FIG. 1, other network types and network components may also be used. For instance, more than one autonomous vehicle 110 may be included in the network 130, and each may be identified by a unique MAC address. Similarly, more than one server 120 may be included in the network 130, and the servers may work independently from or collaboratively with each other.

A server 120 may include a processor and a memory (not shown). The server 120 may store in its memory information relevant to the navigation of the vehicle 110. Such information may include maps, traffic patterns, and road conditions. The server 120 may receive from the vehicle 110 information related to one or more of the following: map updates, map corrections, traffic pattern updates, and traffic pattern corrections. The server 120 may store the received information in its memory. In some aspects, the server 120 may distribute the received information to other vehicles 110 via the network 130.

A vehicle 110 may be any type of vehicle including, but not limited to, cars, trucks, motorcycles, busses, boats, airplanes, helicopters, lawnmowers, recreational vehicles, amusement park vehicles, construction vehicles, farm equipment, trams, golf carts, trains, and trolleys.

Figure 2:
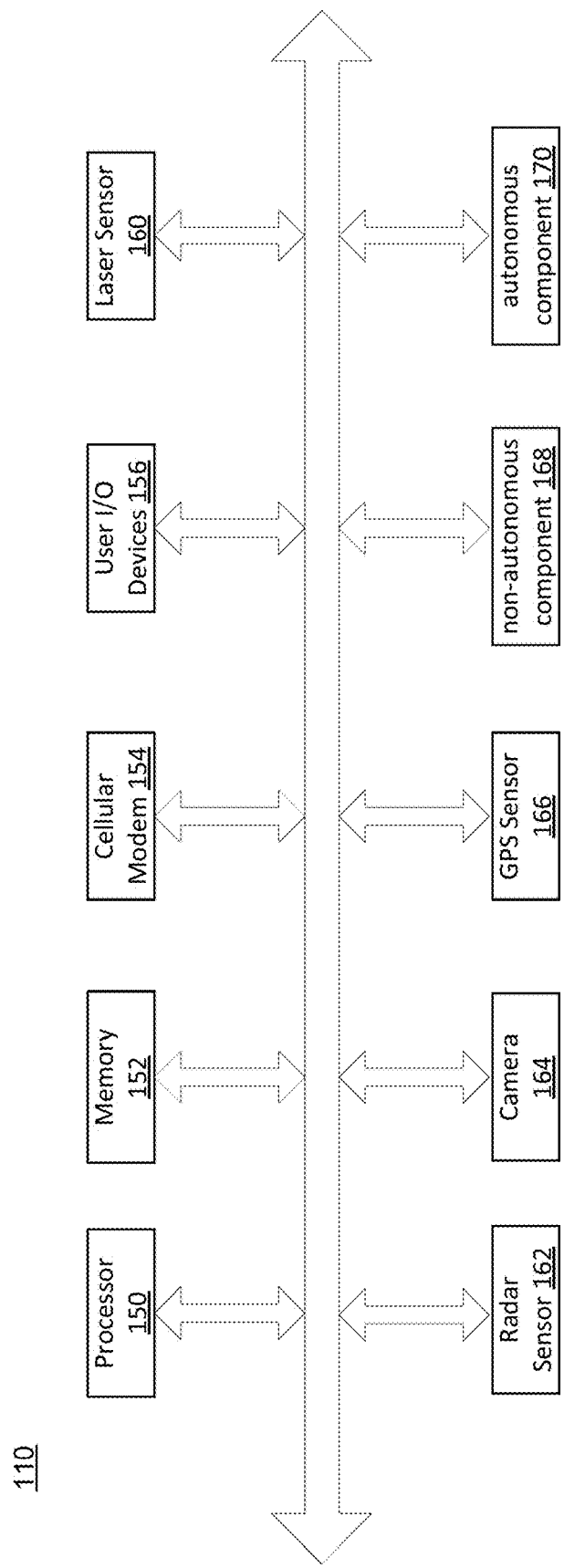
FIG. 2 is a block diagram of a configuration of the autonomous vehicle according to one aspect.

FIG. 2 is a block diagram illustrating hardware configurations of the vehicle 110 in accordance with one aspect of the disclosure. The vehicle 110 may include one or more of the following components: a processor 150, a memory 152, a cellular modem 154, user I/O devices 156, a laser sensor 160, a radar sensor 162, a camera 164, a Global Positioning System (GPS) sensor 166, a non-autonomous component 168, and an autonomous component 170. These components may be operatively connected with each other via physical coupling and/or electrical coupling. One of more of these components may transmit or receive executable instructions in analog/digital signals to or from other component or components. In some aspects, one or more of these components may also transmit or receive communications to or from the server 120 via the network 130. Details with respect to each component are given below.

The processor 150 may be any conventional processor, such as processors from the Intel Corporation or Advanced Micro Devices ("AMD"). Alternatively, the processor 150 may be a dedicated device such as an applicant-specific integrated circuit ("ASIC"). The processor 150 may refer to a collection of processors that may or may not operate in parallel. In one aspect, the vehicle 110 as a whole may have a single processor 150 to perform acts described herein. Alternatively, one or more components of the vehicle 110, e.g., the autonomous component 170, may each have their own processor executing instructions specific to each individual component.

In some aspects, the processor 150 or a collection of processors is physically mounted within the vehicle 110. In some other aspects, the processor 150 or the collection of processors are physically located away from the vehicle 110 and communicate with the vehicle 110 via the network 130. Alternatively, one or more processors 150 of the collection of processors are physically mounted within the vehicle 110, while the remaining processors are remotely connected with the vehicle 110 via the network 130.

The memory 152 may include a volatile memory, a non-volatile memory, or a combination thereof. The volatile memory may include a RAM, such as a dynamic random access memory (DRAM) or static random access memory (SRAM), or any other forms of alterable memory that may be electrically erased and reprogrammed. The non-volatile memory may include a ROM, a programmable logical array, or other forms of non-alterable memory which cannot be modified, or can be modified only slowly or with difficulty.

The cellular modem 154 may include a transmitter and receiver. The modem 154 may receive and transmit information via the network 130. The modem 154 may connect the vehicle 110 to other nodes in the network 130, e.g., the server 120 or other vehicles in the network 130. The modem 154 may transmit to the server 120 information such as maps, information about traffic patterns, and road conditions. In some aspects, the modem 154 may also communicate with roadside sensors, such as traffic cameras or laser sensors stationed on the side of a road.

The user I/O devices 156 may facilitate communication between a user, e.g., a driver or a passenger in the vehicle 110 and the vehicle 110. The user I/O devices 156 may include a user input device, which may include a touch screen. The touch screen may allow the user to switch the vehicle 110 between two operation modes: an autonomous or self-driving mode, and a non-autonomous or operator-driving mode. The user I/O devices 156 may also include a user output device, such as a display or a status bar. The display may display information regarding the status of the vehicle 110. The status bar may indicate the current status of the vehicle 110, e.g., the present operation mode or the present speed.

The laser sensor 160, the radar sensor 162, the camera 164, and the Global Positioning System (GPS) sensor 166 each may observe the environment of the vehicle 110, and provide observation data to the autonomous component 170 of the vehicle 110 for analysis. The observation data may include one or more objects in the surrounding environment of the vehicle 110, such as vehicles, traffic obstacles, traffic signs/signals, trees, and people.

In some aspects, one or more of the sensors may continuously produce observation data to reflect changes or updates in the environment. The sensors may provide updated observation data to the autonomous component 170 in real-time or quasi-real time, or on demand Based on the observation data, the autonomous component 170 may vary navigation parameters, e.g., direction and/or speed of the vehicle 110, as a response to changes in the environment.

Figure 3:
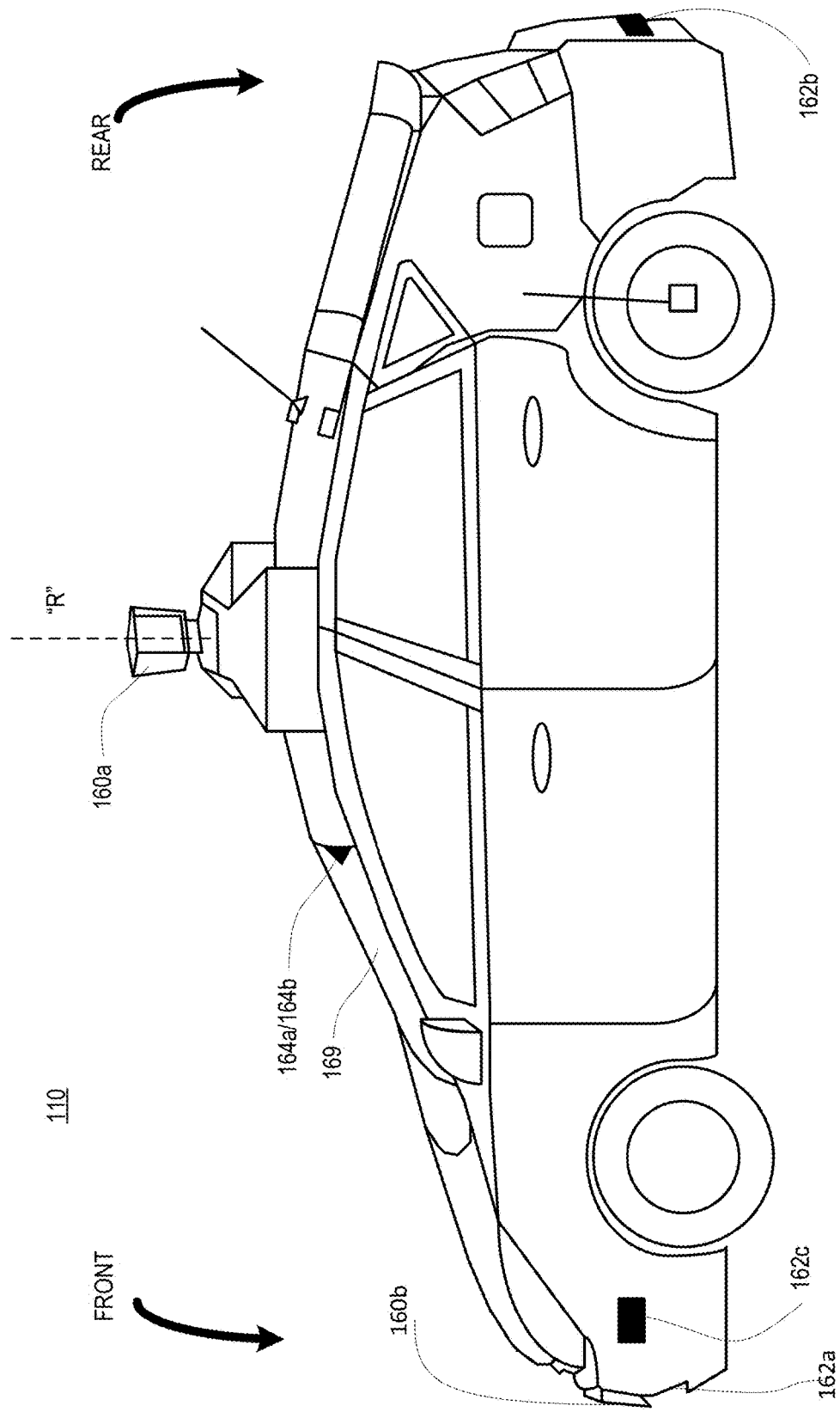
FIG. 3 is a schematic side view of the vehicle.

Details of some of the sensors, including their arrangements on the vehicle 110, are discussed with respect to FIG. 3.

The laser sensor 160 may detect any surrounding object that absorbs/reflects energy radiated from the laser sensor 160. The laser sensor 160 may refer to one or more laser sensors, e.g., 160a and 160b of FIG. 3. In FIG. 3, the laser sensors 160a and 160b may be respectively mounted on the top and the front of the vehicle 110. The laser sensor 160a positioned at the top of the vehicle 110 may have a horizontal field of view in the range between 50 and 80 meters, and a vertical field of view of about 30°. The laser sensor 160b positioned at the front of the vehicle 110 may have a horizontal field of view of about 150 meters, and a vertical field view of about 30°. The fields of view of each laser sensor 160a and 160b may vary as needed.

The laser sensor 160a may be physically connected to the vehicle 110 in a manner that the laser sensor 160a may rotate 360° about a rotation axis "R". In one aspect, to determine a distance between the vehicle 110 and a surrounding object, the laser sensor 160a may first rotate to face a surrounding object, and record observation data while facing the surrounding object. The laser sensor 160a may then output the observation data to the autonomous component 170 for determination of the distance.

The radar sensor 162 may refer to one or more radar sensors, e.g., 162a-c of FIG. 3. The radar sensors 162a-c may be located at various positions on the vehicle 110, e.g., the front or the back of the vehicle 110, or one or both lateral sides of the front bumper. In FIG. 3, the radar sensors 162a-c are positioned, respectively, at the front of the vehicle 110, the back of the vehicle 110, a left lateral side of the front bumper. Another radar sensor (not shown) may be positioned at a right lateral side of the front bumper. In one example, one or more of the radar sensors, e.g., 162a-c, may have a horizontal field of view of about 200 meters, and a vertical field of view of about 18°. In another example, one or more of the radar sensors, e.g., 162a-c, may have a horizontal field of view of about 60 meters, and a vertical field of view of about 56°. The fields of view of each radar sensor 162a-c may vary as needed.

The camera 164 may refer to one or more cameras mounted on the vehicle 110. As shown in FIG. 3, two cameras 164a-b may be mounted under a windshield 169 near the rear view mirror (not shown). The cameras 164a-b may have identical or different fields of view. For instance, one camera 164a may have a horizontal field of view of about 200 meters and a vertical field of view of about 30°, and the other camera 164b may have a horizontal field of view of about 100 meters and a vertical field of view of about 60°. The fields of view of each camera 164a-b may vary as needed. The cameras 164a-b may provide image data to the autonomous component 170 for computing a distance between various objects.

The arrangement of the various sensors discussed above with reference to FIG. 3 is merely exemplary. The arrangement of the sensors may vary as needed.

Returning to FIG. 2, the non-autonomous component 168 may include hardware typically found in a non-autonomous car. For instance, the non-autonomous component 168 may include one or more of the following: engine components and parts, braking system, suspension and steering system, transmission system, wheels and tire parts, lighting and signaling system, and other devices or systems that facilitate manual operation the vehicle 110.

The autonomous component 170 may operate the vehicle 110 autonomously or semi-autonomously, without user interventions. The autonomous component 170 may control a set of navigation parameters of the vehicle 110, which may relate to the speed or direction of the vehicle 110. The autonomous component 170 may translate the navigation parameters into physical actions of the vehicle 110. In some aspects, the autonomous component 170 may actuate systems or parts of the non-autonomous component 168, e.g., braking system or engine, based on the navigation parameters. The autonomous component 170 may also vary settings of the systems or parts of the non-autonomous component 168 based on the navigation parameters.

The autonomous component 170 may adjust the vehicle 110 in response to changes in the surrounding environment of the vehicle 110. Specifically, the autonomous component 170 may receive observation data produced by various sensors discussed above. The autonomous component 170 may adjust one or more of the navigation parameters based on the observation data.

In one aspect, the autonomous component 170 may synthesize the observation data, and use the synthesized data to assess validity, expiration or accuracy of maps relied on by the vehicle 120. More details regarding this aspect are discussed next with reference to FIG. 4.

Figure 4:
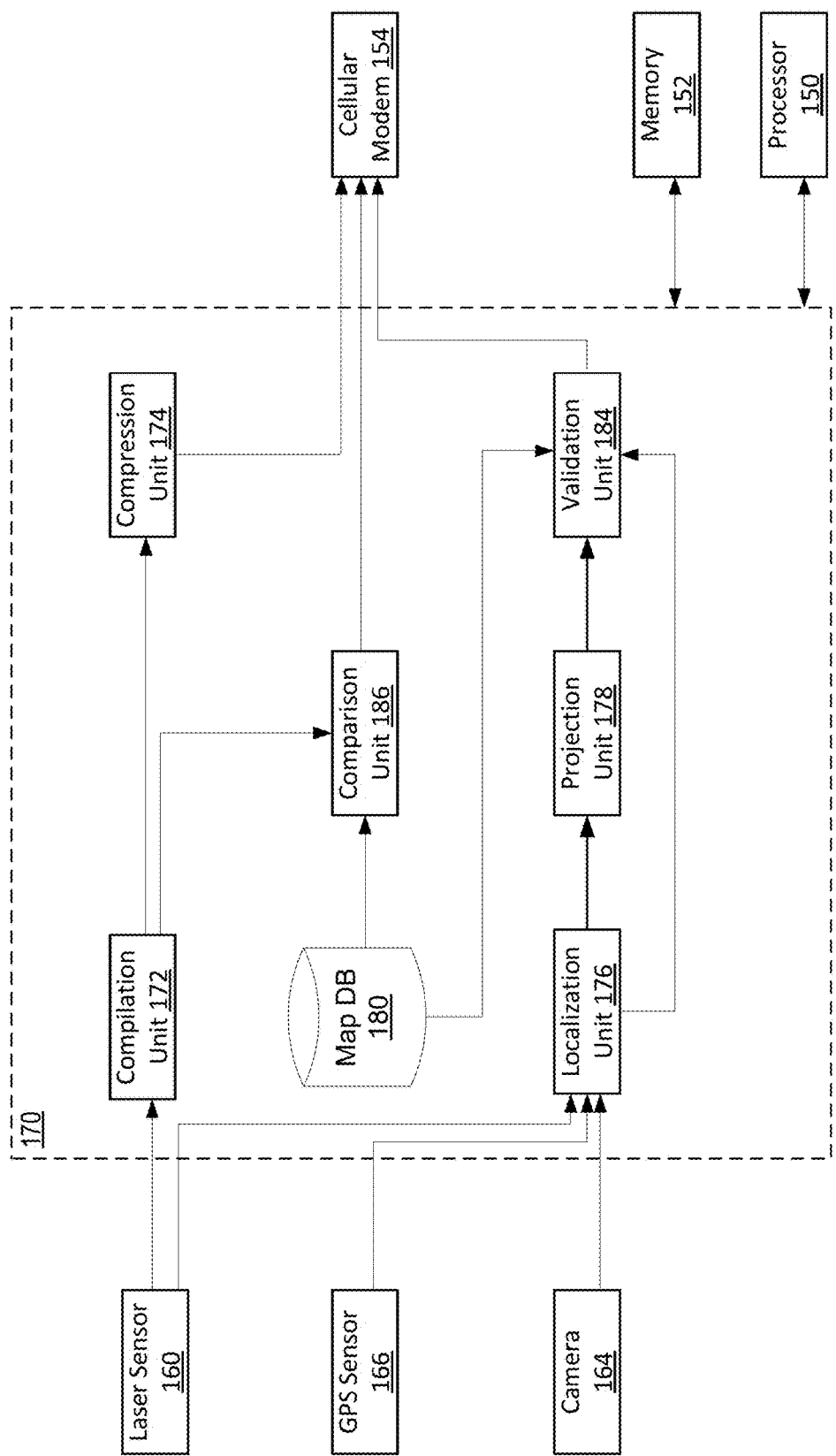
FIG. 4 is a block diagram of a configuration of an autonomous component of the vehicle.

FIG. 4 is a block diagram illustrating an example of a configuration of the autonomous component 170. In one aspect, the autonomous component 170 may include one or more of the following units: a compilation unit 172, a compression unit 174, a localization unit 176, a projection unit 178, a map database 180, a validation unit 184, and a comparison unit 186. Details with respect to each unit are as follows.

The compilation unit 172 may receive observation data captured by the laser sensor 160, and may compile the observation data. The observation data may be raw images that have not been marked upon or altered by the processor 150. FIGS. 5A-5C illustrate schematic views of raw images captured by one of the laser sensors, e.g., 160a-b, at various points 512-516 along a vehicle path illustrated in FIG. 5.

Figure 5:
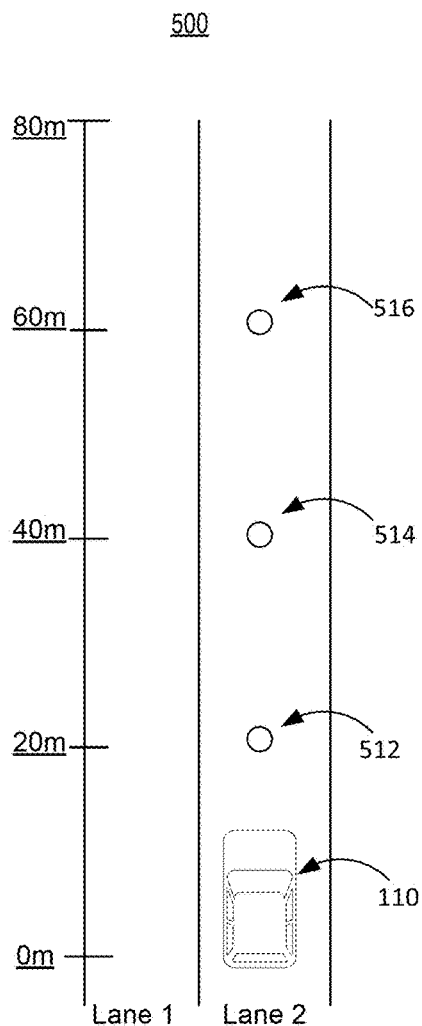
FIG. 5 is a schematic top down view of a road and a trajectory of the vehicle along the road.
Figure 5A:
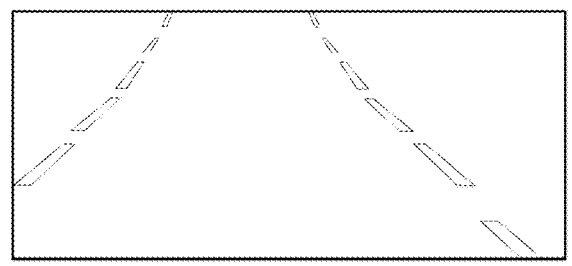
FIGS. 5A-C are schematic views of raw images captured by a laser sensor as the vehicle maneuvers along the road of FIG. 5.
Figure 5B:
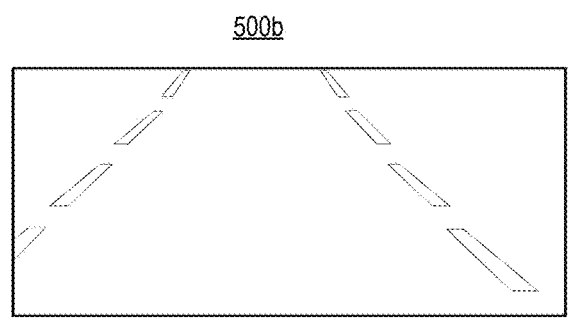
Figure 5C:
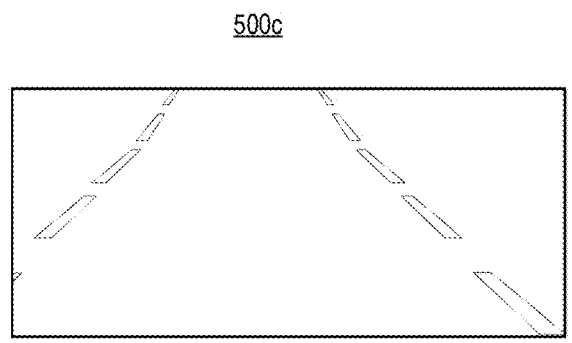

Referring to FIG. 5, the road 500 includes two lanes: Lane 1 and Lane 2. Each lane may have a length about 80 m. In this example, as the vehicle 110 proceeds along Lane 2, at least one of the laser sensors, e.g., 160a-b, captures raw images of the surrounding environment, e.g., the road 500, at various points, e.g., 512-526, along the path of the vehicle 110. FIGS. 5A-C illustrate raw images 500a-c that are taken by the laser sensor 160a or 106b at points 152-156, respectively.

One or more raw images may capture various details of the path taken by the vehicle 110, including the type, color and number of lines on the road 500. For instance, the raw images may indicate one or more of the following information: a solid yellow line, a broken yellow lines, solid yellow double lines, two sets of solid double yellow lines spaced 2 feet or more apart, a solid white line, and a broken white line, double white lines. In FIGS. 5A-C, the raw images 500a-c each illustrate two broken white lines that are separated by a standard 12-foot lane width.

After receiving the raw images from the laser sensor 160, the compilation unit 172 may compile the raw images. For instance, the compilation unit 172 may synthesize raw images captured over a given period of time, or along a given path. The compilation unit 172 may synthesize the raw images when the vehicle 110 operates in either the autonomous mode or the non-autonomous mode. For instance, the compilation unit 172 may request or receive raw images from the laser sensor 160 when the non-autonomous mode starts, and stop requesting or receiving raw images from the laser sensor 160 when the non-autonomous mode stops.

The compilation unit 172 may render a raw image from a 3D view image to a 2D view image. The rendering process may take into consideration of the configurations of the laser sensor 160, e.g., the horizontal and vertical fields of view, and/or the degree of rotation. The compilation unit 172 may also assemble all the 2D view images together to form a clean Mercator projection of the path taken by the vehicle 110. During this processes, some of the 2D view images may partially overlap each other.

Figure 5D:
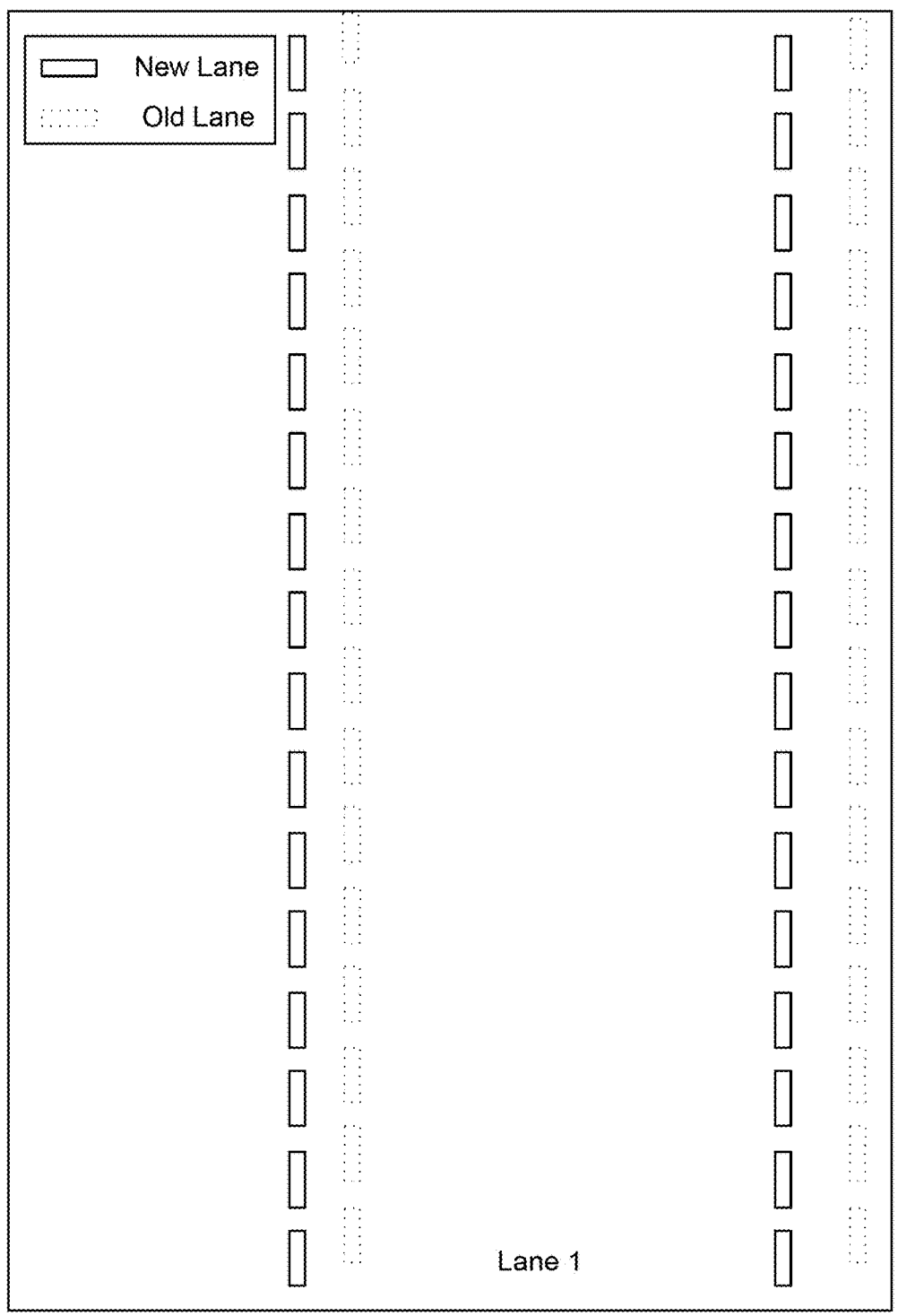
FIG. 5D is a compiled image produced by a compilation unit of the autonomous component according to one aspect.

FIG. 5D is a pictorial, schematic view of a compiled image 500d produced by the compilation unit 172, indicating the current state of the road 500. In FIG. 5D, the solid lines are derived from compilation of the raw images, representing the current state of the road 500. The dashed lines may represent the past state of the road 500 recorded on a map that has been previously prepared. As shown in FIG. 5D, discrepancies exist between the current state of the road 500 and the past state of the same road. Accordingly, the discrepancies in FIG. 5D may suggest that the previously prepared map which records the past state of the road 500 becomes invalid or expired.

Figure 10:
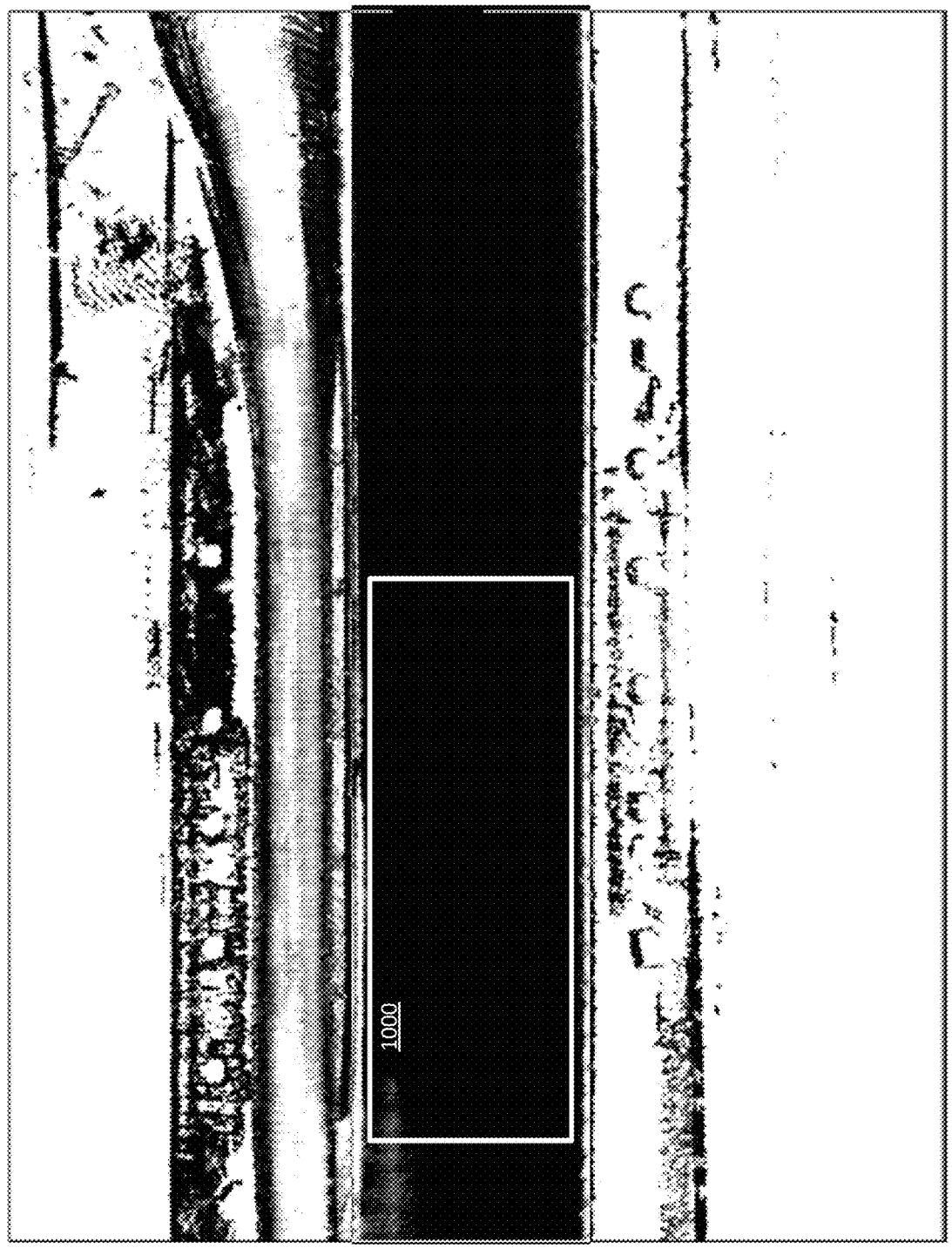
FIG. 10 is a compiled image based on real raw data generated by a laser sensor depicting an area having a subarea under construction.
Figure 11:
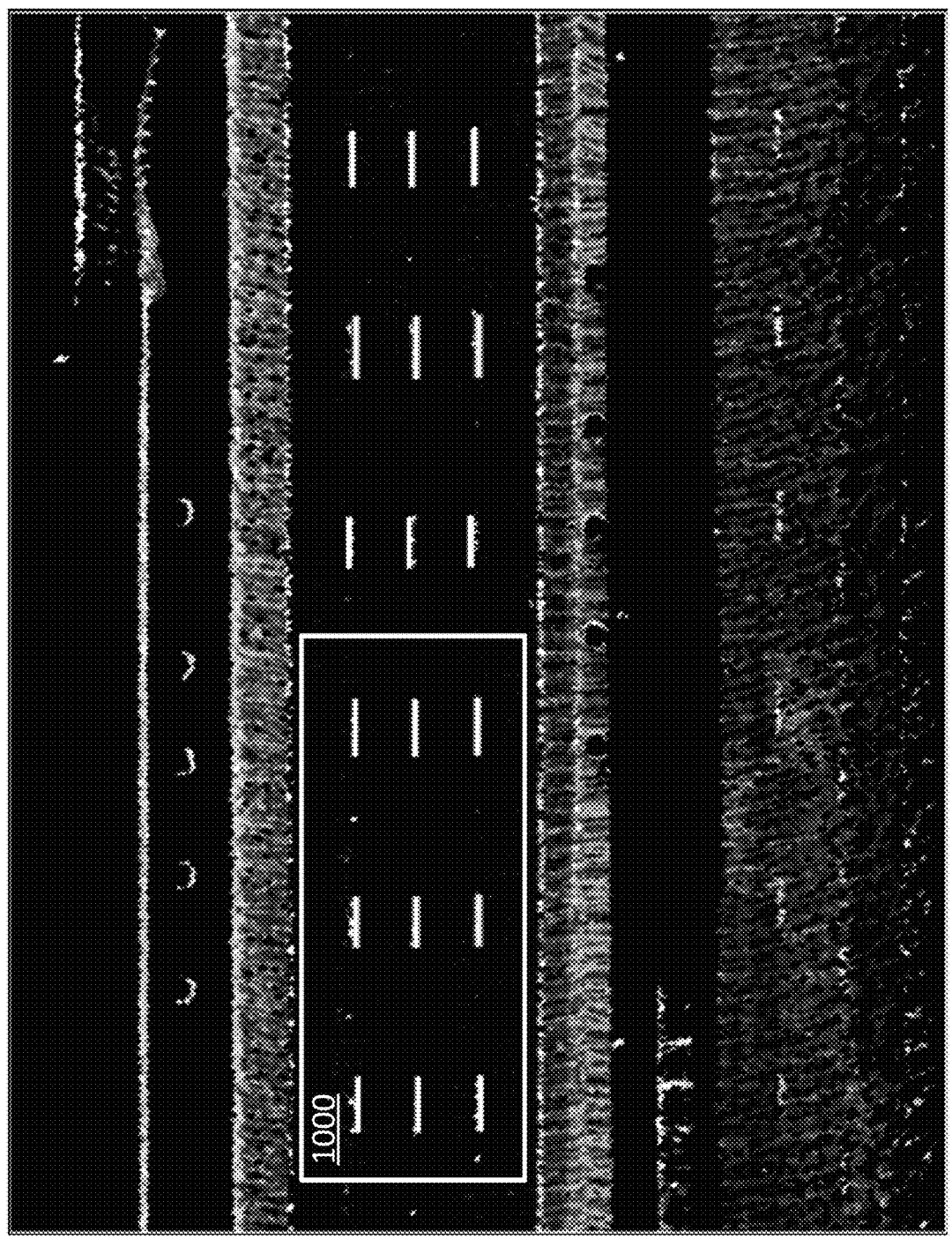
FIG. 11 is another compiled image illustrated the same area of FIG. 10 after the construction is over.

FIGS. 10 and 11 provide examples of images compiled from real raw images captured by a laser sensor about the same area. FIG. 10 represents a compiled image of the area, having a subarea 1000 under construction. As shown in FIG. 10, the subarea 1000 is plain, and no features are illustrated therein. FIG. 11 represents a compiled image of the same area, illustrating the state of the subarea 1000 after completion of the construction. As shown in FIG. 11, as a result of the construction, the subarea 1000 is now painted with white lane lines on the road. Accordingly, a comparison of FIGS. 10 and 11 reveals that any map based on the image of FIG. 10 becomes invalid, outdated or expired.

Referring back to FIG. 4, the compression unit 174 may perform image compression to reduce irrelevance and redundancy of the compiled image output by the compilation unit 172. The compression unit 174 may reduce quality, resolution or size of the compiled image. The image compression technique performed by the compression unit 174 may be lossy or lossless. For instance, the compression unit 174 may use one or more of the following techniques to compress images: run-length encoding, entropy encoding, deflation, chain codes, chroma subsampling, transform coding, and fractal compression.

As indicated in FIG. 4, the compression unit 174 may output the compressed image to the cellular modem 154. The cellular modem 154 may send the compressed image to the server 120 via the network 130.

Figure 6:
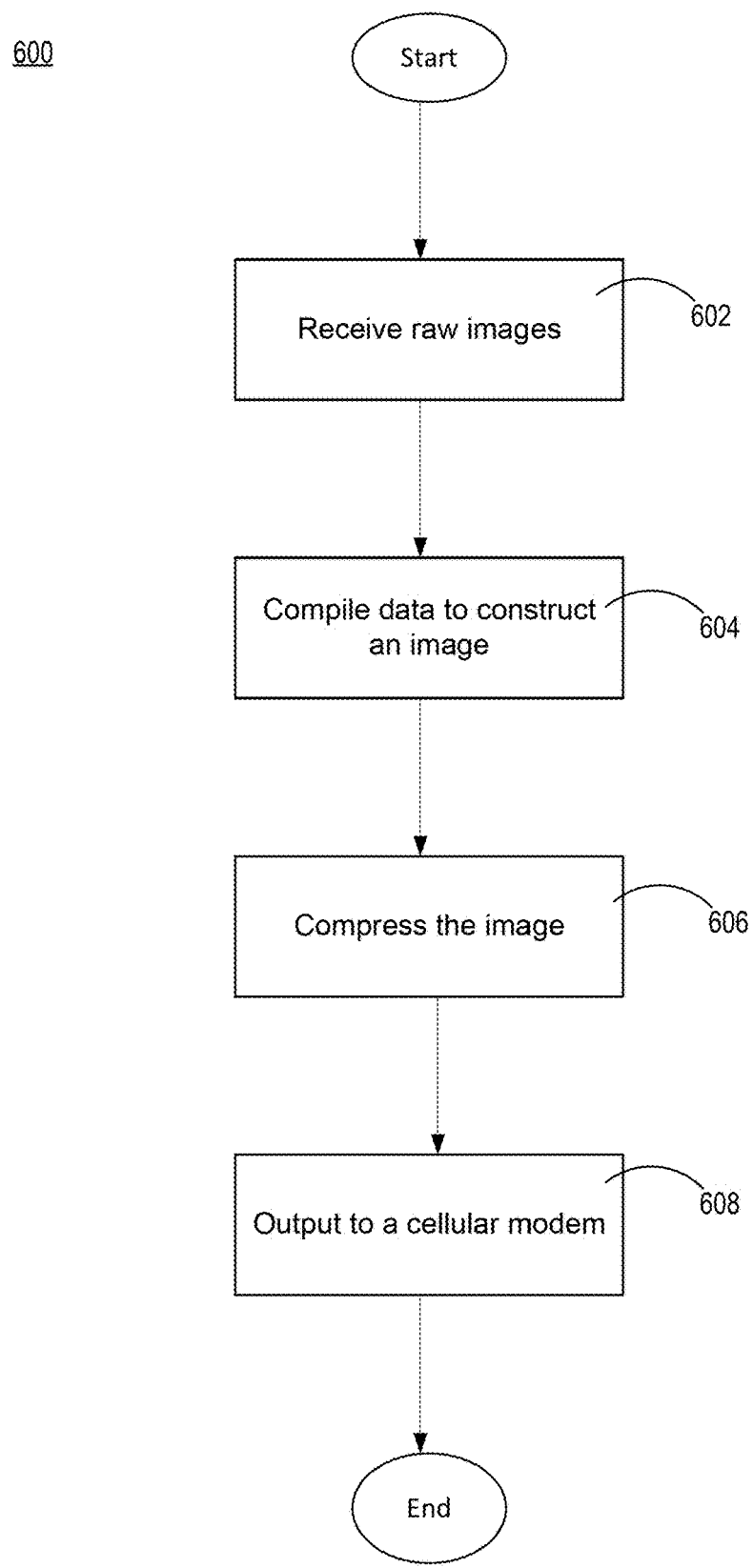
FIG. 6 is a flowchart illustrating operations by the autonomous component according to one aspect.

FIG. 6 provides a flowchart 600 illustrating a method performed by the autonomous component 170 for processing raw images. At block 602, the compilation unit 172 of the autonomous component 170 receives one or more raw images from the laser sensor 160. Thereafter, at block 604, the compilation unit 172 generates a compiled image based on the raw images received at block 602. Specifically, the compilation unit 172 may render a plurality of raw images taken at different locations along an actual path of the vehicle 110 into a single compiled image. The single compiled image indicates features of the actual path. At block 606, the compression unit 174 of the autonomous component 170 compresses the compiled image produced by the compilation unit 172 into a reduced form. The reduced form may be the result of reduction in image quantity, reduction in image resolution or reduction in image size. At block 608, the autonomous component 170 outputs the compressed image generated by the compression unit 174 to the cellular modem 154. The cellular modem 154 may then transmit the compressed image to the server 120 via the network 130.

Depending on the bandwidth of the network 130, the autonomous component 170 may selectively transmit either the compiled image outputted by the compilation unit 172 or the compressed image outputted by the compression unit 174 to the server 120. For instance, when the bandwidth is low, the autonomous component 170 may transmit the compressed image outputted by the compression unit 174 to the server 120. Conversely, when the bandwidth is high, the autonomous component 170 may transmit the compiled image outputted by the compilation unit 172 to the server 120.

Referring back to FIG. 4, the autonomous component 170 may temporarily or permanently store a plurality of maps of the real world in a map database 180. The map database 180 may be a relational database. Maps may be stored in one or more of the following formats: compressed or uncompressed, lossless (e.g., BMP) or lossy (e.g., JPEG), and bitmap or vector-based (e.g., SVG), as well as computer instructions for drawing graphics. The maps may comprise any information sufficient to identify the relevant information, such as numbers, descriptive text, proprietary codes, references to data stored in areas of the same memory or different memories (including other network locations) or information that is used by a function to calculate the relevant data.

The maps may include environmental data that was obtained at a previous point in time and is expected to persist regardless of the vehicle's presence in the environment. For example, a map may include detailed map information, e.g., highly detailed maps detecting the shape and elevation of roadways, lane lines, intersections, crosswalks, speed limits, traffic signals, buildings, signs, real time traffic information, or other such features and information. These features may be persistent. For example, when the vehicle 110 approaches the location of a feature in the detailed map information, the vehicle 110 may expect to detect the feature. The detailed map information may also include explicit speed limit information associated with various roadway segments. The speed limit data may be entered manually or scanned from previously taken images of a speed limit sign using, for example, optical-character recognition. The detailed map information may also include two-dimensional street-level imagery, such as highly detailed image data depicting the surroundings of a vehicle from the vehicle's point-of-view. The detailed map information may also include three-dimensional terrain maps incorporating one or more of the objects listed above.

The maps may include detailed map information such as zone information, indicating zones that are unsuitable for driving autonomously. For example, an on-ramp, off-ramp, or other complicated or high traffic areas may be identified as such zones as a driver may feel the need to continuously monitor the vehicle in case the driver must take control. Other zones may be identified as unsuitable for any driving, such as a sidewalk, river, mountain, cliff, desert, etc.

The detailed map information may also include one or more roadgraphs or graph networks of information such as roads, lanes, intersections, and the connections between these features. Each feature may be stored as graph data and may be associated information such as a geographic location and whether or not it is linked to other related features. For example, a stop sign may be linked to a road and an intersection, etc. In some examples, the associated data may include grid-based indices of a roadgraph to allow efficient lookup of certain roadgraph features.

Figure 7A:
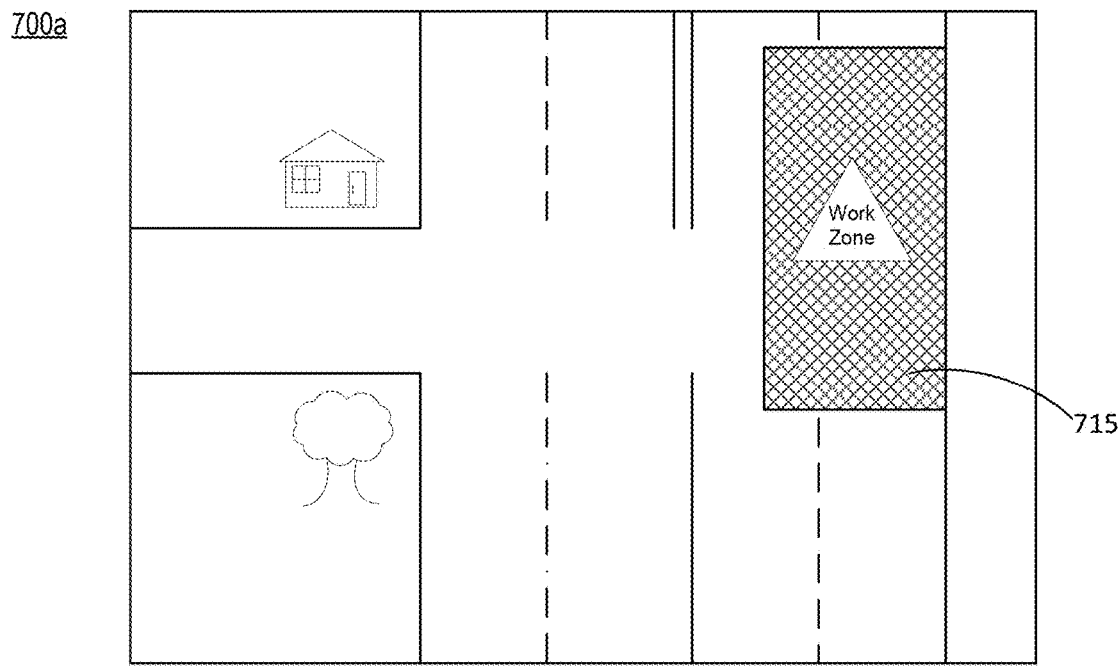
FIG. 7A is a schematic view of a map stored in a map database illustrating a work-zone area under construction.

In some examples, the map information may include zones. A zone may include a place where driving may become complicated or challenging for humans and computers, such as merges, construction zones, or other obstacles. As described in more detail below, a zone's rules may require an autonomous vehicle to alert the driver that the vehicle is approaching an area where it may be challenging for the vehicle to drive autonomously. In one example, the vehicle may require a driver to take control of steering, acceleration, deceleration, etc. For instance, FIG. 7A illustrates a map 700*a* including a problematic zone 715, which is a construction or work zone unsuitable for driving autonomously. In another example, a zone's rules may require an autonomous vehicle to alert the driver, but rather than requiring the driver to take control, the vehicle may lower its speed and/or increase its following distance (between the autonomous vehicle and another vehicle).

Figure 7B:
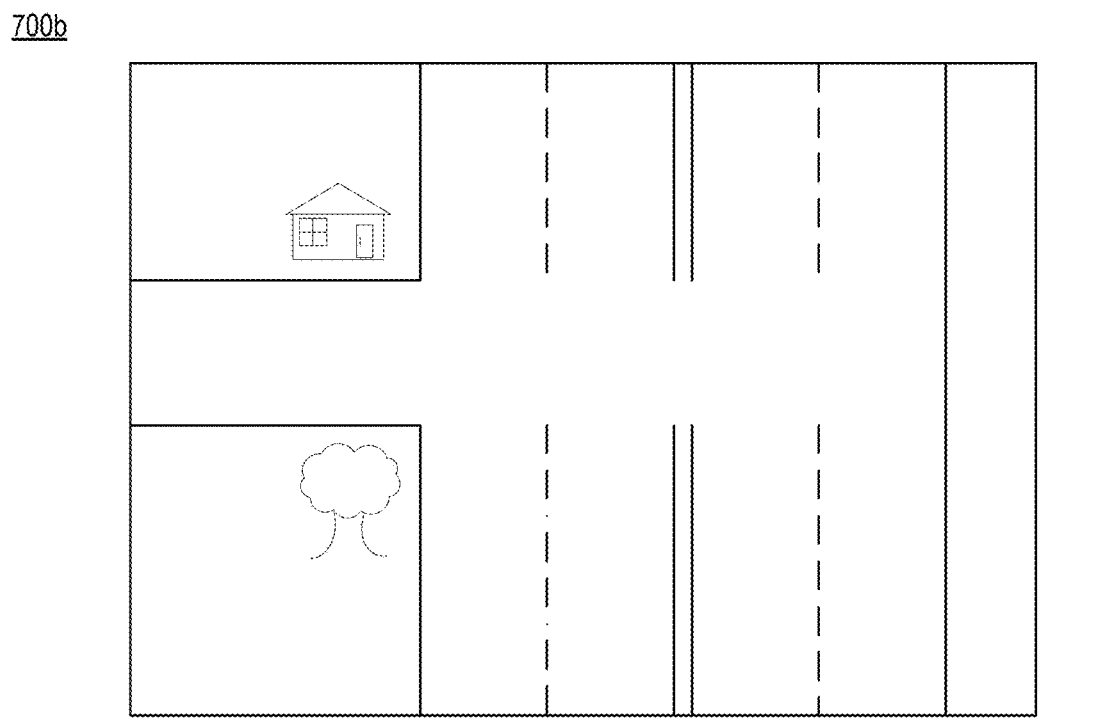
FIG. 7B is a schematic view of a compiled image corresponding to the same area of FIG. 7A after construction is over.

Referring back to FIG. 4, the autonomous component 170 may include a comparison unit 186 that assesses validity of a map retrieved from the map database 180. The comparison unit 186 may receive a map from the map database 180, and may receive the compiled image from the compilation unit 172, where both the map and the compiled image relate to the same area, or relate to the same problematic zone. The comparison unit 186 may compare the compiled image to the map of the same area/zone, and determine if there is any discrepancy. If there is, the comparison unit 186 may issue an alert signal to the cellular modem 154, indicating that the map is invalid or outdated. The cellular modem 154 may transmit the alert signal to the server 120 via the network 130. For instance, with reference to FIGS. 7A-B, 700*a* may represent the map related to Area 1 retrieved from the map database 180, and 700*b* may represent the compiled image generated by the compilation unit 172 which also relates to Area 1. Because the map 700*a* illustrates a work zone 715 absent from the compiled image 700*b*, the comparison unit 186 may issue an alert indicating that the map 700*a* is invalid or outdated.

Figure 6A:
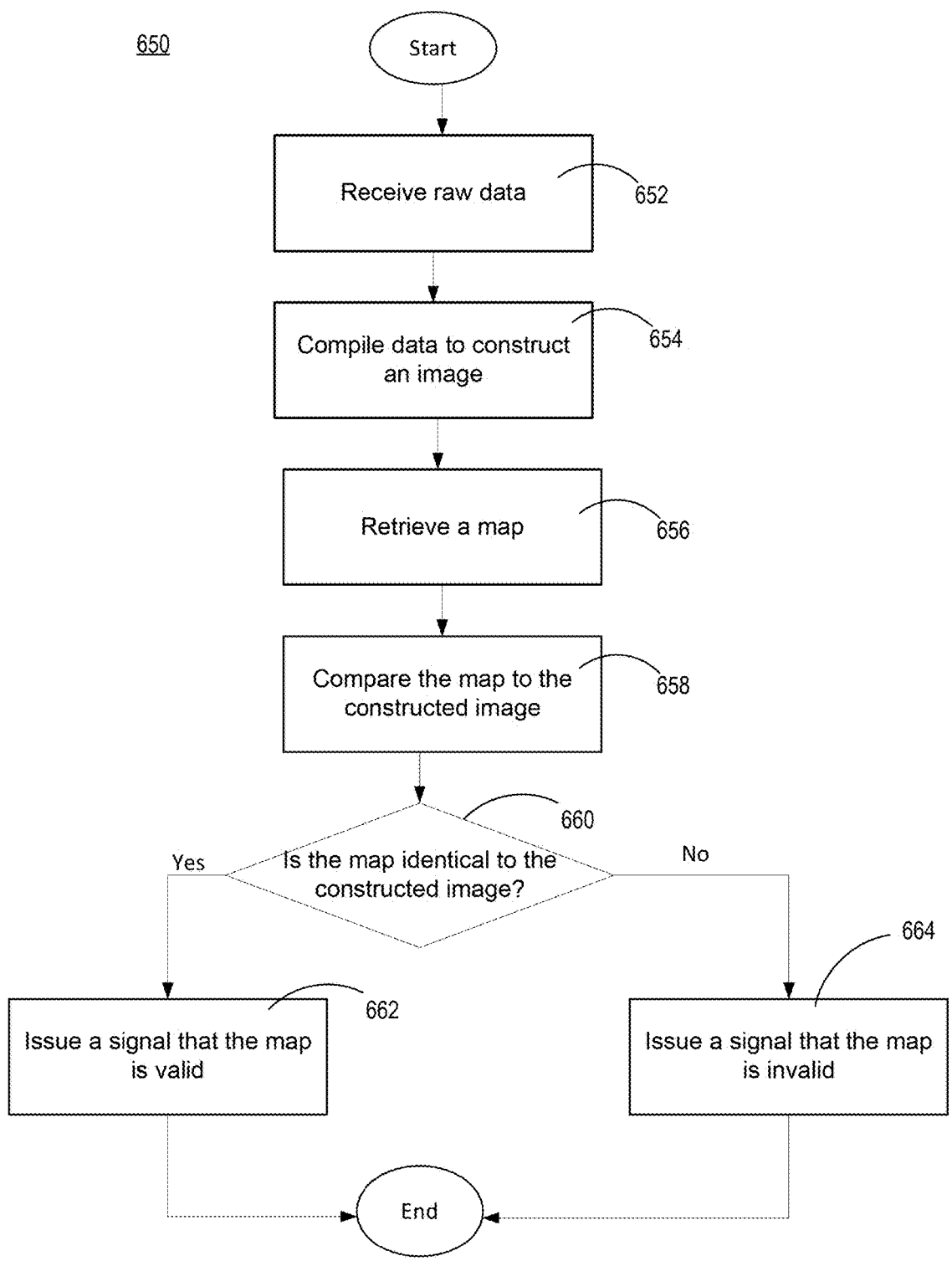
FIG. 6A is a flowchart illustrating operations by the autonomous component according to another aspect.

FIG. 6A provides a flowchart 650 illustrating a method performed by the autonomous component 170 according to this aspect. Blocks 652-654 may be identical to blocks 602-604 discussed with reference to FIG. 6. At block 656, the autonomous component 170 retrieves a map from the map database 180 corresponding to the same geographical area captured by the raw data at block 652. At block 658, the comparison unit 186 compares the retrieved map to the compiled image obtained at block 654. If the comparison unit 186 determines in block 660 that no discrepancy exists between the retrieved map and the compiled image, the comparison unit 186 may reach a conclusion that the retrieved map remains valid or up-to-date. At that point, the method may terminate or, alternatively, may issue a signal to the cellular modem 154 indicating that the retrieved map remains valid (block 662). However, if the comparison unit 186 determines that a discrepancy exists, the comparison unit 186 may issue a signal to the cellular modem 154 that the map becomes invalid, outdated, or expired (block 664). The cellular modem 154 may subsequently pass signals to the server 120. The server 120 may then make decisions as to how to update the map.

Returning to FIG. 4, the localization unit 176 of the autonomous component 170 may determine the current geographic location of the vehicle 110. For instance, the localization unit 176 may derive the present location of the vehicle 110 based on information collected or derived from one or more of the following sensors: the GPS sensor 166, the laser sensor 160, the camera 164, and an inertial-aided sensor (not shown). The localization unit 176 may determine the location of the vehicle, including one or more of the following: an absolute geographical location, e.g., latitude, longitude, and altitude, and a relative location, e.g., location relative to other cars immediately around the vehicle 110. The mechanism used to determine the relative location may produce less signal distortion compared to the mechanism used to determine the absolute geographical location. Accordingly, the relative location may be more accurate than the absolute geographical location. The location of the vehicle 110 may also indicate the position of the vehicle 110 relative to a ground level, e.g., an underground position when the vehicle is in a tunnel or a cave, or an aboveground position.

The location unit 176 may run for a given time frame, for a given area of interest, or when the vehicle 110 is in either the autonomous mode or the non-autonomous mode. In one aspect, the localization unit 176 starts to determine location of the vehicle 110 once the vehicle 110 enters a particular zone. In another aspect, the localization unit 176 starts to determine location of the vehicle 110 once the autonomous mode is activated. The localization unit 176 may output the current location of the vehicle 110 to the projection unit 178.

Figure 7C:
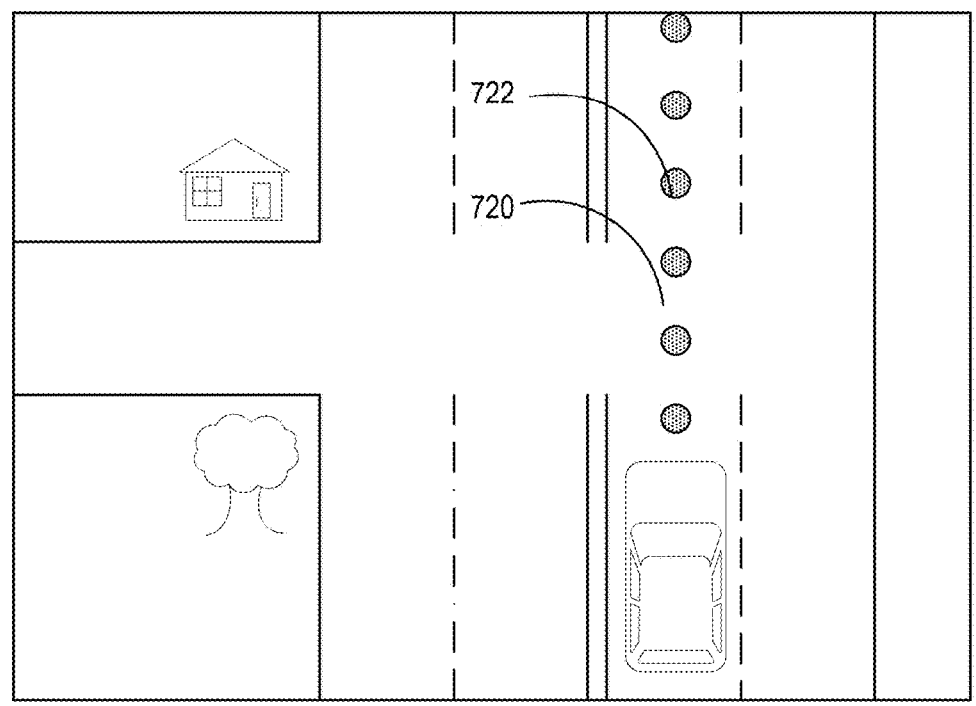
FIG. 7C is a schematic view of an actual trajectory after construction is over.

The projection unit 178 may receive locations of the vehicle 110 periodically from the localization unit 176. Alternatively, the projection unit 178 may demand provision of locations of the vehicle 100 from the localization unit 176. The projection unit 178 may keep in record the locations of the vehicle 110 during a given time frame, or when the vehicle 110 is in an area of interest, e.g., a problematic area where obstacles were previously recorded. Alternatively, the projection unit 178 may start recording the locations of the vehicle 110 when the vehicle 110 enters an autonomous mode. The projection unit 178 may stop recording once the vehicle 110 exits the autonomous mode. Based on the serious locations recorded, the projection unit 178 may project an actual trajectory taken by the vehicle 110. For instance, as illustrated in FIG. 7C, the projection unit 178 determines an actual trajectory 720 taken by the vehicle 110 in an area.

Referring back to FIG. 4, the validation unit 184 may assess validity, currency or expiration of a map. More specifically, the validation unit 184 may receive a map from the map database 180 of a particular area. Additionally, the validation unit 184 may receive one or more of the following information related to the same area: the actual trajectory taken by the vehicle 110 from the projection unit 178, and the current location of the vehicle 110 output by the localization unit 176.

In one aspect, the validation unit 184 may compare the retrieved map with the actual trajectory. The validation unit 184 may determine if the map includes a plausible path that is consistent with the actual trajectory. If there is no plausible path on the map that is consistent with the actual trajectory, the validation unit 184 may conclude that the map is invalid, outdated or expired. For instance, the validation unit 184 may receive a map 700a of FIG. 7A from the map database 180, and may receive an actual trajectory 720 of FIG. 7C from the projection unit 178, both of which relate to the same area. The map 700a includes a problematic zone, e.g., construction or work zone 715, and represents the state of the area before completion of the construction. By contrast, the actual trajectory 720 of FIG. 7C represents a path taken by the vehicle 110 after completion of the construction, and more particularly, after the removal of the construction or work zone 715. If the construction or work zone 715 were still in place, a path along the actual trajectory 720 would not be plausible. Accordingly, by comparing the map 700a with the actual trajectory 720, the validation unit 184 may conclude that the map 700a of FIG. 7A is invalid, outdated or expired.

In another aspect, the validation unit 184 may compare the retrieved map with the current location of the vehicle 110 as received from the localization unit 176. The validation unit 184 may determine if the map includes a plausible location, which may be reached by the vehicle 110, in consistency with the current location of the vehicle 110. If there is no plausible location on the map that is consistent with the current location of the vehicle 110, the validation unit 184 may conclude that the map is invalid, outdated or expired. For instance, similar to the scenario described above, the vehicle 110 may receive the map 700a of FIG. 7A from the map database 180, which represents the state of the area before completion of the construction. The current location as received by the validation unit 184 may be the location 722 in FIG. 7C, which is a location that used to be occupied by the construction or work zone 715. If the construction or work zone 715 were still in place, the vehicle 110 would not be able to arrive at the location 722. Accordingly, the validation unit 184 may conclude that the map 700a of FIG. 7A is invalid, outdated or expired.

In another aspect, the validation unit 184 may assess validity of the map based on both the actual trajectory of the vehicle 110 and the current location of the vehicle 110. The validation unit 184 may determine (1) whether the map includes a plausible path consistent with the actual trajectory, and (2) whether the map includes a plausible location consistent with the current location. If the answer is "No" to at least one of the questions, the validation unit 184 may conclude that the map is invalid. However, if the answer is "Yes" to both questions, the validation unit 184 may conclude that the map remains valid.

Once the validation unit 184 has determined that the map is invalid, outdated or expired, the validation unit 184 may issue an alert signal to the cellular modem 154 indicating that the map is invalid. The cellular modem 154 may transmit the alert signal to the server 120 via the network 130.

If the map remains valid or up-to-date, the validation unit 184 may issue a signal to the cellular modem 154 indicating that the map remains valid. The cellular modem 154 may in turn transmit the same instruction to the server 120.

In another aspect, the validation unit 184 may output the actual trajectory received from the projection unit 178 to the cellular modem 154. The cellular modem 154 may transmit the actual trajectory to the server 120 via the network 130 for analysis.

Figure 8:
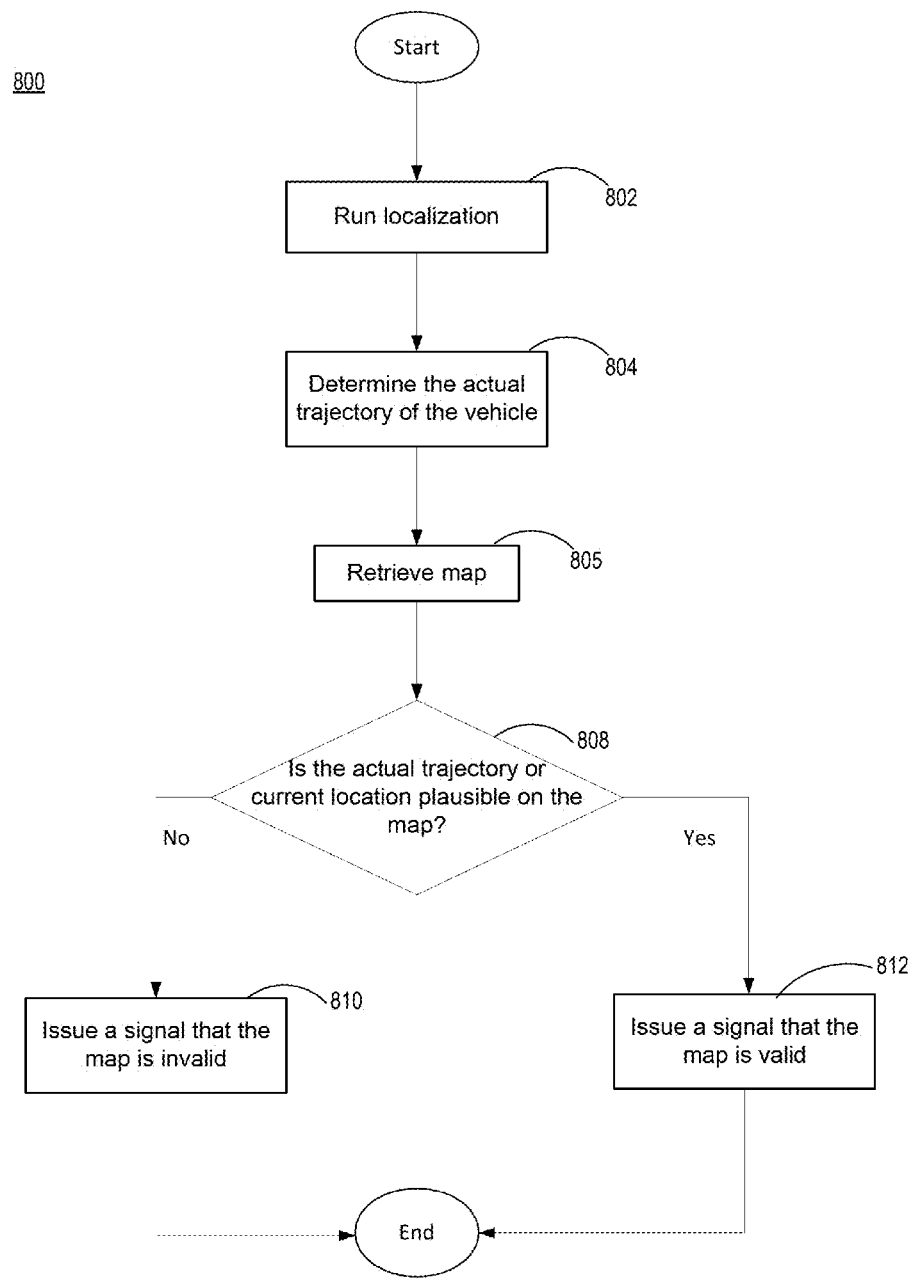
FIG. 8 is a flowchart illustrating operations by the autonomous component according to one aspect.

FIG. 8 a flowchart 800 illustrating a method performed by the autonomous component 170 for assessing validity of a map according to one aspect described above. At block 802, the localization unit 176 may determine a set of locations visited by the vehicle 110, including the current location of the vehicle 110. The localization unit 176 may run in a degraded mode, such that the unit 176 may determine the vehicle location at a low frequency. Under such mode, the determination made about the location of the vehicle 110 may be less accurate than that under a fully-functional mode.

At block 804, the projection unit 178 projects the actual trajectory of the vehicle 110 based on the set of locations determined by the localization unit 176. The set of locations are determined by the localization unit 176 during the period when the vehicle 110 is in a particular area. Alternatively, the set of locations may be determined during the period of time when the vehicle 110 is in a non-autonomous mode.

At block 805, the autonomous component 170 may retrieve a map from the map database 180 corresponding to the same area in which localization has been performed.

At block 808, the validation unit 184 compares the retrieved map to at least one of the following: the actual trajectory and the current location of the vehicle 110. The validation unit 184 may determine at least one of the following two questions: (1) whether the map includes a plausible path consistent with the actual trajectory, and (2) whether the map includes a plausible location consistent with the current location of the vehicle 110. If the answer is "No" to at least one of the two questions, the validation unit 184 may conclude that the map is invalid, outdated or expired. Otherwise, the validation unit 184 may conclude that the map remains valid or up-to-date.

At block 810, once the validation unit 184 has concluded that the map is invalid, the validation unit 184 may issue an alert to the server 120 that the map is invalid. The server 120 may act accordingly, e.g., update the identified map. On the other hand, if the validation unit 184 has concluded that the map remains valid, the validation unit 184 may then terminate or, alternatively, the validation unit 184 may issue a signal to the server 120, at block 812, that the map remains valid.

In some aspects, the server 120 may have a map database identical or similar to the map database 180 in the autonomous component. The two map databases may be synchronized overtime via the network 130.

Figure 9:
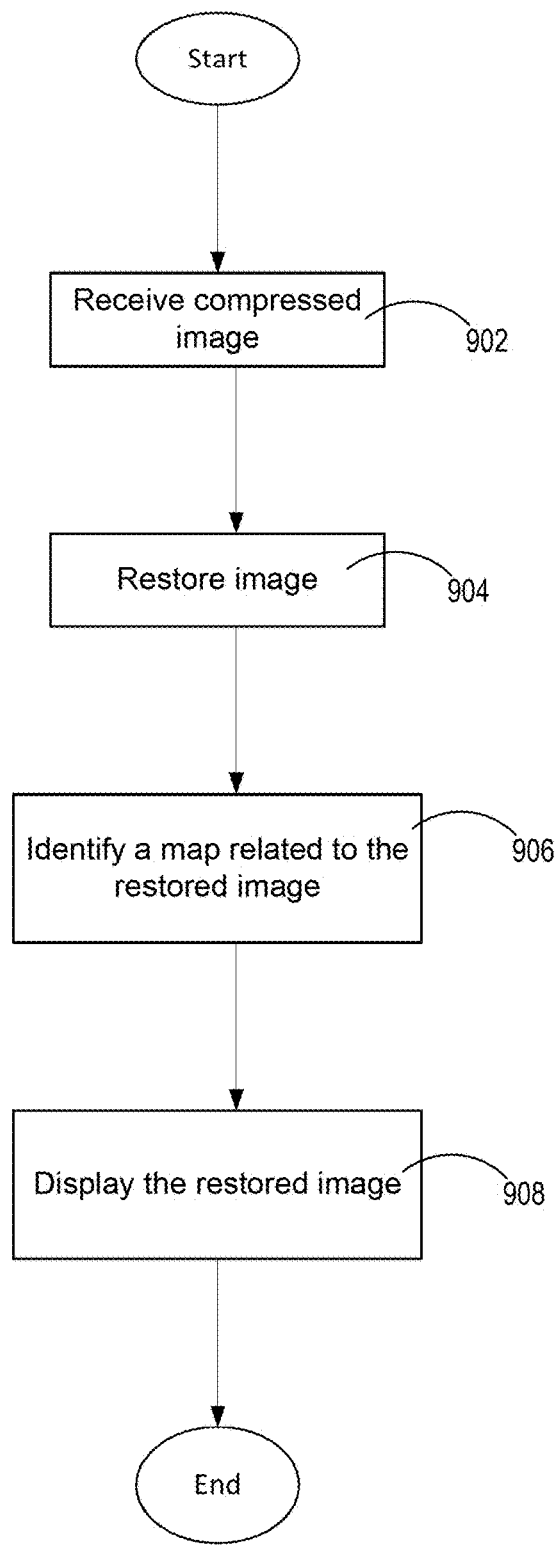
FIG. 9 is flowchart illustrating operations by the server according to one aspect.

FIG. 9 provides a flowchart 900 illustrating a method performed the server 120 according to one aspect. The server 120 may receive a compressed image produced by the compression unit 174 from the autonomous component 170 via the network 130. At block 904, the server 120 may reconstruct the compressed image. At this block, the server 120 may restore the compiled image produced by the compilation unit 172 based on the compressed image. At block 906, the server 120 may identify a map related to the restored image. The map may relate to the same geographical are as that of the restored image or the compressed image. At block 908, the server 120 may present the identified map and the restored image to the user 140 via a display. The restored image may overlay on top of the identified map. The user 140 may then make informed decision of whether the identified map remains valid, or becomes invalid or expired.

Aspects of the present disclosure may be advantageous in that they provide for increased accuracy of navigational data, and therefore provide for increased safety in the operation of vehicles. Moreover, because updated map information and other information related to roadways may be detected and generated using sensors on the vehicle to which the map information will be delivered, this information is highly accurate. Furthermore, this highly accurate information may be provided to other vehicles through a network to enable those vehicles to update their navigational information as well.

As these and other variations and combinations of the features discussed above can be utilized without departing from the subject matter as defined by the claims, the foregoing description of exemplary implementations should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method for assessing validity of a map, comprising:
receiving a compressed image describing a path of a vehicle through an area, wherein the compressed image is an image derived from image data collected by a sensor;
reconstructing, by one or more processors, the compressed image to form a first image;
identifying, by the one or more processors, a map related to the area;
displaying, by the one or more processors, the first image in relation to the map, by overlaying the first image on top of the map such that same objects appearing in both the first image and the map appear at same geographical areas, and determining whether one or more discrepancies exist between the map and the first image;
assessing, by the one or more processors, validity of the map based on the display of the first image in relation to the map; and
maneuvering the vehicle based on the assessed validity of the map.

2. The method of claim 1, wherein the map includes an area prohibiting entry for travel.

3. The method of claim 2, wherein the area prohibiting entry includes a construction zone.

4. The method of claim 2, wherein the area prohibiting entry includes a merger zone.

5. The method of claim 1, further comprising receiving the compressed image from a cellular modem.

6. The method of claim 1, further comprising, if one or more discrepancies exist between the map and the first image, transmitting a signal to a remote computing device indicating that the map is invalid.

7. The method of claim 1, further comprising, if no discrepancies exist between the map and the first image, transmitting a signal to a remote computing device indicating that the map is valid.

8. A method for assessing validity of a map, comprising:
determining, by one or more processors a current location of a vehicle, using a sensor of the vehicle;
identifying, by the one or more processors, a map related to the current location of the vehicle, the map including an area prohibiting entry for travel;
determining, by the one or more processors, whether the map includes a plausible location unobstructed for travel when the area prohibiting entry for travel overlaps with the current location of the vehicle;
assessing, by the one or more processors, validity of the map based on the determination;
maneuvering the vehicle based on the assessed validity of the map; and
transmitting a signal indicating that the map is invalid when the map does not include the plausible location consistent with the current location of the vehicle.

9. The method of claim 8, further comprising:
transmitting a signal to a server via a network indicating a result of the assessing.

10. The method of claim 8, wherein the sensor comprises at least one of a laser sensor, a Global Positioning System sensor, and a camera.

11. The method of claim 8, further comprising transmitting a signal indicating that the map is valid when the map includes the plausible location consistent with the current location of the vehicle.

12. The method of claim 8, further comprising terminating the method when the map does not include the plausible location consistent with the current location of the vehicle.

13. The method of claim 8, wherein determining the current location of the vehicle includes determining a set of locations visited by the vehicle including the current location.

14. The method of claim 13, wherein the set of locations are determined during a period of time when the vehicle is in a non-autonomous mode.

15. The method of claim 8, wherein determining the current location of the vehicle includes using a low frequency to determine the current location.

16. The method of claim 8, wherein the area prohibiting entry includes a construction zone.

17. The method of claim 8, wherein the area prohibiting entry includes a merger zone.

* * * * *